(12) United States Patent
Schiel

(10) Patent No.: US 11,686,578 B2
(45) Date of Patent: Jun. 27, 2023

(54) EXPANDABLE LEVEL

(71) Applicant: Uwe Schiel, White Rock (CA)

(72) Inventor: Uwe Schiel, White Rock (CA)

(*) Notice: Subject to any disclaimer, the term of this patent is extended or adjusted under 35 U.S.C. 154(b) by 0 days.

(21) Appl. No.: 17/303,884

(22) Filed: Jun. 9, 2021

(65) Prior Publication Data

US 2022/0397394 A1 Dec. 15, 2022

(51) Int. Cl.
*G01C 9/28* (2006.01)

(52) U.S. Cl.
CPC ................................ *G01C 9/28* (2013.01)

(58) Field of Classification Search
CPC ........................................................ G01C 9/28
USPC ................... 33/374, 375, 383, 384
See application file for complete search history.

(56) References Cited

U.S. PATENT DOCUMENTS

| | | | | |
|---|---|---|---|---|
| 5,249,365 A * | 10/1993 | Santiago | ........... | G01C 9/28 33/451 |
| 5,388,338 A * | 2/1995 | Majors | ........... | E04F 21/241 33/376 |
| 5,412,875 A * | 5/1995 | Hilderbrandt | ........... | G01C 9/28 33/451 |
| 5,577,327 A * | 11/1996 | Archambault | ........... | G01C 9/28 33/374 |
| 5,617,641 A * | 4/1997 | Aarhus | ........... | G01C 9/26 33/376 |
| 6,047,478 A * | 4/2000 | Sowers | ........... | G01C 9/26 33/379 |
| 6,550,156 B1 * | 4/2003 | Scoville | ........... | F16L 55/18 33/645 |
| 6,640,455 B1 * | 11/2003 | Smothers | ........... | G01C 9/02 33/375 |
| 6,658,752 B1 * | 12/2003 | Bonaventura, Jr. | ...... | G01C 9/26 33/375 |
| 6,694,632 B1 * | 2/2004 | Schooley | ........... | G01C 9/28 33/375 |
| 7,497,022 B1 * | 3/2009 | Aarhus | ........... | G01C 9/26 33/376 |
| 8,413,343 B2 * | 4/2013 | Hale | ........... | G01C 15/10 33/375 |
| 9,003,672 B2 * | 4/2015 | Lozano, IV | ........... | F24S 25/00 33/408 |
| 10,962,365 B2 * | 3/2021 | Hui | ........... | G01D 11/14 |
| 11,255,667 B1 * | 2/2022 | Panosian | ........... | G01C 9/28 |
| 2002/0116833 A1 * | 8/2002 | Hollenbeck | ........... | G01C 9/26 33/375 |
| 2015/0113821 A1 * | 4/2015 | Fulton | ........... | G01B 3/1084 33/767 |

(Continued)

*Primary Examiner* — George B Bennett
(74) *Attorney, Agent, or Firm* — Orin Del Vecchio

(57) ABSTRACT

An expandable level that is configured to extend from a first length to a second length in order to identify a vertical or horizontal plane across a greater distance. The level of the present invention includes a body wherein the body has a first portion and a second portion. The first portion and second portion are axially aligned and secured together in the first position of the level with a fastener. The first portion and second portion of the body have telescoping support members operably coupled therebetween. The telescoping support members include a plurality of segments that facilitate the expansion of the length of the level wherein the first portion and second portion are moved away from each other. Sight windows and level bubbles are in both the first portion and second portion.

8 Claims, 1 Drawing Sheet

(56) References Cited

U.S. PATENT DOCUMENTS

2020/0018597 A1\* 1/2020 Tang ................... G01C 9/26
2020/0132455 A1\* 4/2020 Sanders ............... G01C 9/28
2022/0163326 A1\* 5/2022 Kirby .................. G01C 9/34

\* cited by examiner

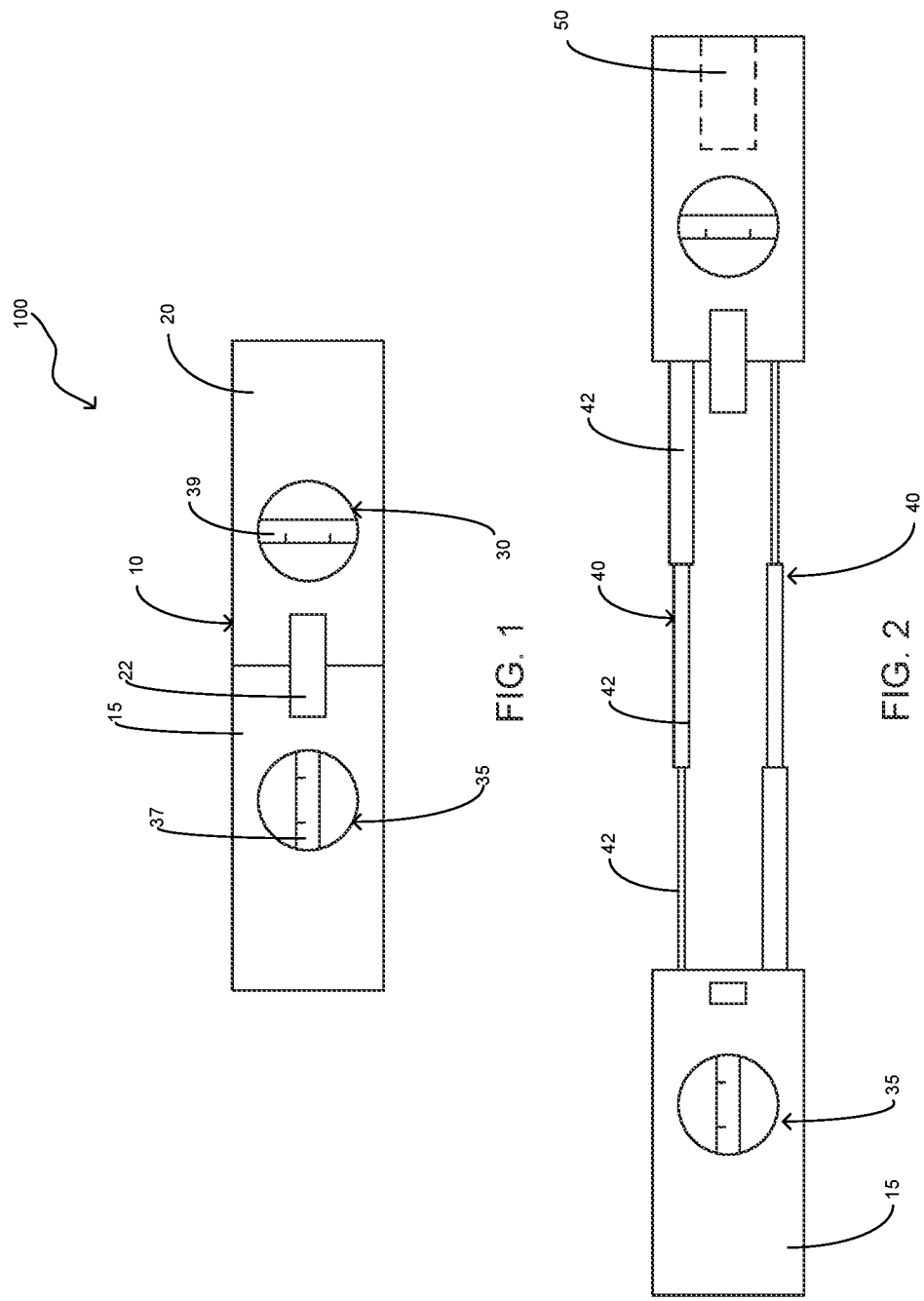

EXPANDABLE LEVEL

FIELD OF THE INVENTION

The present invention relates generally to construction tools, more specifically but not by way of limitation a level wherein the level of the present invention is expandable in length in order to accommodate alternate scenarios so as to more effectively identify a level plane across the desired area.

BACKGROUND

Hand tools have been in existence for hundreds of years and are typically application specific. Tools such as but not limited to hammers and saws are utilized in various fields of construction wherein the construction projects can vary from commercial buildings to cabinet making and many other types of construction. One common tool that is utilized in most fields of construction is a level. As is known in the art, a level is utilized to identify either a perfectly horizontal plane or vertical plane. These horizontal and/or vertical planes are important to ensure alignment of elements being utilized in the construction process. Additionally, it is also important in some fields that a perfect vertical plane is identified and it is ensured that the construction element is placed and/or secured in the most vertical position.

Conventional levels are provided in various sizes wherein the sizes are provided to accommodate alternate types of projects. By way of example but not limitation, a six foot level may be used by an individual during the construction of a home while a two foot level may be used by an individual constructing a cabinet. As levels are provided in specific lengths, many levels cannot accommodate a wide variety of tasks and as such it is common for an individual working in the trades to have a set of levels wherein the levels in the set are provided in alternate lengths.

It is intended within the scope of the present invention to provide a level wherein the level of the present invention is expandable so as to facilitate the ability to accommodate the capability to find a horizontal and/or vertical plane across a greater distance as compared to a fixed length level.

SUMMARY OF THE INVENTION

It is the object of the present invention to provide a level that is configured to be expandable in order to accommodate a broader range of tasks wherein the present invention includes a body.

Another object of the present invention is to provide an expandable level that is operable to be extended and/or contracted in order to provide indication of a level plane across a broader distance wherein the body of the present invention includes a first portion and a second portion.

A further object of the present invention is to provide a level that is configured to be expandable in order to accommodate a broader range of tasks wherein the first portion and second portion of the body are axially aligned and movably coupled to each other.

Still another object of the present invention is to provide an expandable level that is operable to be extended and/or contracted in order to provide indication of a level plane across a broader distance that further includes telescoping support members that are configured to operably couple the first portion and second portion of the body.

An additional object of the present invention is to provide a level that is configured to be expandable in order to accommodate a broader range of tasks wherein the first portion of the body includes at least one level bubble in a sight window.

Yet a further object of the present invention is to provide an expandable level that is operable to be extended and/or contracted in order to provide indication of a level plane across a broader distance wherein the second portion of the body includes at least one level bubble in a sight window.

Another object of the present invention is to provide a level that is configured to be expandable in order to accommodate a broader range of tasks wherein the sight window/level bubble assemblies in each of the first portion and second portion of the body can be configured for both a horizontal plane indication or a vertical plane indication.

An alternate object of the present invention is to provide an expandable level that is operable to be extended and/or contracted in order to provide indication of a level plane across a broader distance wherein the body is manufactured from a rigid lightweight material such as but not limited to plastic or metal.

An alternative objective of the present invention is to provide a level that is configured to be expandable in order to accommodate a broader range of tasks wherein the body further includes a clip wherein the clip can be utilized to releasably secure the level of the present invention to an object such as but not limited to a belt.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a front view of the present invention in its collapsed position; and FIG. 2 is a front view of the present invention in its extended position.

DETAILED DESCRIPTION

References now to the drawings submitted herewith, wherein various elements depicted therein are not necessarily drawn to scale and wherein through the views and figures like elements are referenced with identical reference numerals, there is illustrated an expandable level 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Drawings submitted as a part hereof, the expandable level 100 includes a body 10 wherein the body is manufactured from a rigid lightweight material such as but not limited to metal or plastic. The body 10 is rectangular in shape and includes a first portion 15 and a second portion 20. The body 10 is configured to have a first position and a second position. In its first position the first portion 15 and second portion 20 are adjacent and secured together with fastener 22. The first position of the body 10 is illustrated herein in FIG. 1. In the second position of the body 10 the first portion 15 and the second portion 20 are separated having a void therebetween. The second position of the body 10 is illustrated herein in FIG. 2 submitted as a part hereof.

The first portion 15 of the body 10 includes a sight window 35 and level bubble 37. The sight window 35 is annular in shape and provides visibility to the level bubble 37 from either side of the body 10. While the sight window 35 is annular in shape in the drawings illustrated herein, it is contemplated within the scope of the present invention that the sight window 35 could be provided in alternate shapes. Furthermore, it should be understood within the scope of the present invention that the level bubble 37 could be provide for identifying either a horizontal and/or vertical plane. Additionally, while one sight window 35 is illustrated in the embodiment herein, it should be understood within the scope of the present invention that the first portion 15 of the body 10 could have more than one sight window.

The second portion 20 of the body 10 includes a sight window 30 and level bubble 9. The sight window 30 is annular in shape and provides visibility to the level bubble 39 from either side of the body 10. While the sight window 30 is annular in shape in the drawings illustrated herein, it is contemplated within the scope of the present invention that the sight window 30 could be provided in alternate shapes. Furthermore, it should be understood within the scope of the present invention that the level bubble 39 could be provide for identifying either a horizontal and/or vertical plane. Additionally, while one sight window 30 is illustrated in the second portion 20 of the body 10, it should be understood within the scope of the present invention that the second portion 20 of the body 10 could have more than one sight window.

Referring in particular to FIG. 2, the expandable level 100 includes telescoping support members 40. The telescoping support members 40 provide the operable connection between the first portion 15 and second portion 20 in order to facilitate the movement of the body 10 between its first position and its second position. The telescoping support member 40 includes a plurality of segments 42 that are slidably coupled. The telescoping support members 40 are arranged in a paired parallel position in order to ensure the stability of the body 10 in its second position. While a pair of telescoping support members 40 are illustrated herein, it is contemplated within the scope of the present invention that the expandable level 100 could have as few as one telescoping member or more than two telescoping members. Furthermore, while telescoping segments 42 have been utilized in the present invention, it is further contemplated within the scope of the present invention that the first portion 15 and second portion 20 could be moved between the first position and second position utilizing alternate types of expandable mechanisms.

The body 10 further includes a clip 50 secured to the second portion 20. The clip 50 is manufactured from a resilient metal and functions to provide a technique for a user to releasably secure the expandable level 100 to their belt. While no particular length of expansion is required, it is contemplated within the scope of the present invention that the body 10 would extend from twelve inches in length to thirty six inches in length when moved from its first position to its second position.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A level comprising:
    a body, said body having a first portion and a second portion, said first portion and said second portion being axially aligned, said body having a first position and a second position, wherein in said first position said first portion and said second portion are adjacent, said first portion further including at least one first sight window, said at least one first sight window having at least one first level bubble present therein and said second portion includes at least one second sight window, said at least one second sight window in said second portion having at least one second level bubble secured therein oriented perpendicular to said first level bubble;
    an expansion support member positioned between said first portion and said second portion, said expansion support member configured to movably couple said first portion and said second portion, said expansion member operable to facilitate movement of said first portion and said second portion of said body in opposing direction; and wherein the body is expandable from a length in said first position to a length in said second position wherein the length in said second position is greater than that of the length in said first position.

2. The level as recited in claim 1, wherein said expansion support member is comprised of a plurality of telescoping segments.

3. The level as recited in claim 2, and further including a fastener, said fastener being operable to secure said first portion and said second portion of said body so as to maintain the body in said first position.

4. The level as recited in claim 3, wherein the level of the present invention is expandable from said first position to said second position from a length of twelve inches to thirty six inches.

5. A level configured to identify a horizontal plane and a vertical plane across objects wherein the objects have different distances therebetween wherein the level comprises:

a body, said body being rectangular in shape, said body having a first portion and a second portion, said first portion and said second portion being axially aligned, said first portion and said second portion being movably coupled, said body having a first position and a second position, wherein in said first position said first portion and said second portion are adjacent, said first portion further including at least one first sight window, said at least one first sight window having at least one first level bubble secured therein and said second portion includes at least one second sight window, said at least one second sight window in said second portion having at least one second level bubble secured therein oriented perpendicular to said first level bubble;

at least one telescoping support member positioned between said first portion and said second portion, said at least one telescoping support member configured to movably couple said first portion and said second portion, said at least one telescoping support member operable to facilitate movement of said first portion and said second portion of said body, said at least one telescoping support member further including a plurality of segments; and wherein the body is expandable from a length in said first position to a length in said second position wherein the length in said second position is greater than that of the length in said first position.

6. The level configured to identify a horizontal plane and a vertical plane across objects wherein the objects have different distances therebetween as recited in claim 5, and further including a clip, said clip being secured to said body, said clip configured to releasably secure the body to a belt.

7. The level configured to identify a horizontal plane and a vertical plane across objects wherein the objects have different distances therebetween as recited in claim 6, and further including a fastener, said fastener being operable to secure said first portion and said second portion of said body so as to maintain the body in said first position.

8. The level configured to identify a horizontal plane and a vertical plane across objects wherein the objects have different distances therebetween as recited in claim 7, wherein the body is expandable from said first position to said second position wherein the body is a length of twelve inches in said first position and a length of thirty six inches in said second position.

\* \* \* \* \*